United States Patent
Ichimura et al.

(10) Patent No.: US 6,580,438 B1
(45) Date of Patent: Jun. 17, 2003

(54) SYSTEMS AND METHODS FOR MAINTAINING UNIFORMITY IN A PRESENTATION ENVIRONMENT

(75) Inventors: Satoshi Ichimura, Palo Alto, CA (US); Lester D. Nelson, Santa Clara, CA (US); Elin R. Pedersen, Redwood City, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/444,204

(22) Filed: Nov. 22, 1999

(51) Int. Cl.$^7$ .............................. G06F 3/00; G06F 17/00

(52) U.S. Cl. ..................... 345/732; 345/730; 345/765; 715/523; 235/462.15

(58) Field of Search .............................. 345/732, 730, 345/731, 765, 700, 156, 762, 750; 707/500.1, 522–524, 529; 235/375, 435, 454, 462.01, 462.13, 462.15; 434/314, 315, 308, 365, 428, 430; 715/500.1, 522–524, 529

(56) References Cited

U.S. PATENT DOCUMENTS

| | | | |
|---|---|---|---|
| 4,994,987 A | | 2/1991 | Baldwin ..................... 434/305 |
| 5,001,696 A | | 3/1991 | Baldwin ..................... 365/244 |
| 5,331,547 A | | 7/1994 | Laszlo ......................... 705/2 |
| 5,473,744 A | * | 12/1995 | Allen et al. ............. 707/500.1 |
| 5,539,658 A | * | 7/1996 | McCullough ............... 345/730 |
| 5,859,623 A | * | 1/1999 | Meyn et al. ................ 345/730 |
| 5,874,724 A | | 2/1999 | Cato .......................... 235/492 |
| 5,965,860 A | * | 10/1999 | Oneda ................... 235/375 X |
| 6,008,807 A | * | 12/1999 | Bretschneider et al. ...... 345/732 |
| 6,191,783 B1 | * | 2/2001 | Lambourne et al. ........ 345/835 |
| 6,362,838 B1 | * | 3/2002 | Szlam et al. ................ 345/762 |

OTHER PUBLICATIONS

"Tangible Bits: Towards Seamless Interfaces Between People, Bits, and Atoms", H. Ishii et al., Chi'97, Mar. 22–27, 1997.

"Bridging the Paper and Electronic Worlds: The Paper User Interface", W. Johnson et al., INTERCHI '93, Apr. 24–29, 1993.

"Insight Lab: An Immersive Team Environment Linking Paper, Displays, and Data", B. Lange et al., CHI'98, Apr. 18–23, 1998.

"Telerobotic Control Using Augmented Reality", P. Milgram et al., IEEE International Workshop on Robot and Human Communication, 1995.

"Triangles: Tangible Interface for Manipulation and Exploration of Digital Information Topography", M. Gorbet et al., Proceedings of CHI'98, ACM Press, Apr. 1998.

"Squeeze Me, Hold Me, Tilt Me! An Exploration of Manipulative User Interfaces", B. Harrison et al., CHI '98, Apr. 18–23, 1993.

A Model of the Acquisition of Menu Knowledge by Exploration, A. Howes, CHI '94—abstract only.

"Passive Real–World Interface Props for Neurosurgical Visualization", K. Hinckley et al., CHI '94—abstract only.

(List continued on next page.)

Primary Examiner—Raymond J. Bayerl
(74) Attorney, Agent, or Firm—Oliff & Berridge PLC

(57) ABSTRACT

In a presentation control system environment, the methods and systems of this invention manipulate presentation elements to create a unified display characteristic between the elements selected for presentation. In particular, the systems and methods of this invention receive style identification information that corresponds to at least one attribute tags within a presentation element. A stylizer then manipulates the attribute tags to invoke style preferences governed by the style identification. Therefore, a unified, or customized, look can be achieved with any requested presentation element.

47 Claims, 7 Drawing Sheets

OTHER PUBLICATIONS

"Liveboard: A Large Interactive Display Supporting Group Meetings, Presentations and Remote Collaboration", S. Elrod et al., CHI '92, Human Factors in Computing Systems, ACM Press, pp. 599–607, Monterey.

"Bricks: Laying the Foundations for Graspable User Interfaces", G. Fitzmaurice et al., Proceedings of CHI '95, pp. 422–449, 1995.

"Situated Information Spaces and Spatially Aware Palmtop Computers", G. Fitzmaurice, CACM, 36(7), pp. 38–49, Jul. 1993.

"Triangles: Design of a Physical/Digital Construction Kit", M. Gorbet et al., Proceedings of DIS '97, Mar. 1997.

"Tilting Operations for Small Screen Interfaces (Tech Note)", J. Rekimoto, UIST '96.

"Alternative Human–Web Interaction Systems", R. Schlosser et al., http://ils.unc.edu/alternative/alternative.html, Jun. 1999—abstract only.

"Design of Spatially Aware Graspable Displays", D. Small et al., Extended Abstracts of CHI '97, Mar. 22–27, 1997.

"An Overview of the Parc Tab Ubiquitous Computing Experiment", R. Want et al., IEEE Personal Communications, Dec. 1995.

"The Computer for the 21$^{st}$ Century", M. Weiser, Scientific American, Sep. 1991.

"Computer–Augmented Environments: Back to the Real World", P. Weliner et al., Communications of the ACM, vol. 36, No. 7, Jul. 1993.

"Video Mosaic: Laying Out Time in a Physical Space", Wendy E. Mackay et al., Multimedia 94, pp. 165–172, Oct. 1994.

"Dual Device User Interface Design: PDAs and Interactive Television", Scott Robertson et al., INTERCHI '96, pp. 79–86, Apr. 13–18, 1996.

"Supporting Dynamic Downloadable Appearances in an Extensible User Interface Toolkit", Scott E. Hudson et al., UIST 97 Banff, pp. 159–168, 1997.

"PaperLink: A Technique of Hyperlinking from Real Paper to Electronic Content", Toshifumi Arai et al., INTERCHI '97, pp. 327–344, Mar. 22–27, 1997.

"Collaboration Using Multiple PDAs Connected to a PC", Brad A. Myers et al., CSCW 98, pp. 285–294, 1998.

"Illuminating Light: An Optical Design Tool with a Luminous–Tangible Interface", John Underkoffer et al., Proceedings of CHI '98, pp. 1–8, Apr. 18–23, 1998.

"Bridging Physical and Virtual Worlds with Electronic Tags", Roy Want et al., INTERCHI '99, pp. 370–377, May 15–20, 1999.

"PaperClipX—Summer Intern", Tomas Sokoler, http://intern99-1.pal.xerox.com:80/PaperClipX, pp. 1–2, Jun. 24, 1999.

"BiStatix Whitepaper", BiStatix Technology, http://www-.mot.com/LMPS/Indala/bistatix.htm, pp. 1–9, Aug. 31, 1999.

Indala's Proximity Access Field Programming, BiStatix Technology, http://www.mot.com/LMPS/Indala/motrelease.html#bistatix, pp. 1–4, Aug. 31, 1999.

"Palette: A Paper Interface for Giving Presentations", Les Nelson et al., Proceeding of the CHI 99 Conference of Human Factors in Computing Systems, pp. 1–8, May 1999.

* cited by examiner

SYSTEMS AND METHODS FOR MAINTAINING UNIFORMITY IN A PRESENTATION ENVIRONMENT

BACKGROUND OF THE INVENTION

1. Field of Invention

This invention is related to presentation systems.

2. Description of Related Art

A plethora of available software packages are very capable of accomplishing tasks such as word processing, data management and presentation authoring. Specifically, presentation authoring software allows a user to input data which is then translated into "slides." These slides are then electronically displayed to an audience using a presentation system during a presentation to facilitate and supplement a speaker's presentation.

These presentation systems allow a pre-assembled presentation to be replayed. Specifically, these presentation systems allow a user to navigate, via a graphical user interface or keyboard control, to a previous slide, a next slide or another slide within the pre-assembled presentation, or cycle through unrelated slides, i.e., skip slides, to present a more relevant slide of the presentation.

SUMMARY OF THE INVENTION

While presentation authoring software and presentation systems work well for sequential presentations drawing their content from a common source, this technology fails to manipulate the presentations to create a uniform appearance when "slides" are drawn from varying sources. Specifically, and especially in the case of a presentation using electronic media, numerous file types are available from which a presenter can compile information to generate "slides." Furthermore, with each varying type of electronic media, there can be elements within the document that control the context, or appearance, of the document during presentation. For example, context elements may be background color or texture, orientation of the document, transition of the elements into and out of the presentation, font, font size, bullet style, or the like.

The varying formats of the presentation elements, coupled with the varying methods of identifying context within these elements has led presenters to generating piecemeal presentations that lack a uniform or consistent appearance.

This lack of uniformity detracts from the content of the presentation. Furthermore, the lack of uniformity makes it difficult, or impossible, for a presenter to manipulate contextual elements within a presentation unless the presenter has the appropriate software dedicated to that particular presentation element.

Accordingly, the systems and methods of this invention are more attuned to a presenter's environment and allow a majority of the user's attention, as well as the presenter's attention, to be dedicated to tasks other than manipulation of the presentation system, especially when dealing with electronic media of varying formats. Selecting material for viewing and subsequent display to an audience should be as simple as retrieving a transparency, yet sufficiently flexible, functional and dynamic to deal with the dynamic content afforded by available and anticipated presentation and multimedia systems and formats.

This invention provides presentation control systems and methods that provide support for manipulating the context of elements within a presentation.

Specifically, the systems and methods of this invention receive a request to display a presentation element, e.g., a slide. The context of the slide is then manipulated in accordance with a style profile, or template, that can ensure a uniform display characteristic between presentation elements of varying formats.

Alternatively, an identification-carrying device is presented to a sensor of a presentation control system. The presentation control system associates an identification on the identification-carrying device with a presentation element. The presenter then has a variety of options for modifying the style, or context of the presentation element. The stylized presentation element is then presented for display.

This invention separately provides systems and methods for assisting users in presenting electronic media.

This invention separately provides systems and methods that allow a user to interact with a presentation system via a tangible identification-carrying device.

This invention separately provides systems and methods that allow users to create tangible identification-carrying devices containing style identifiers to be applied to the context of presentation elements.

The presentation systems and methods of this invention provide a user with a mechanism that provides ease of use and better support to the user during, for example, a presentation.

The presentation systems and methods of this invention can use physical objects, such as note cards, that contain, or are provided with, identifiers that represent styles to be applied to presentation elements. Mnemonics which clearly express the style, e.g., background color, are represented by an object affixed to the physical object. Along with these mnemonics, users can incorporate additional notes or graphics which may supplement the mnemonic, such as notes describing which background is better for a particular presentation element, which further aid in the display characteristics of the presentation.

The mnemonics incorporated on, attached to, or otherwise associated with the physical object are supplemented by a readable identification device which permits the presentation control systems and methods according to this invention to interpret a user's actions associated with the physical object. For example, a presenter may distribute a set of cards on a table or podium which contain mnemonics representing the material for the presentation. The presenter may also distribute a set of cards that contain identifications of styles in which to present those elements. The presenter can then select a presentation element card, introduce it to the sensor device of the presentation system, and have the context of current or subsequent presentation elements modified to create a custom appearance by introducing a "style card" to the sensor device.

The presentation control systems and methods according to this invention off-load activities from the presenter's over-taxed cognitive system to under-utilized areas, such as the peripheral ranges of the presenter's senses. The presentation control systems and methods according to this invention enable a user to manipulate the context of a presentation while very little attention is dedicated to manipulating a particular user interface. The presentation systems and methods according to this invention engage a wider range of human perception and enable a larger degree of low-intentional interaction than is found in current presentation systems, methods and interfaces. The presentation systems and methods of this invention recognize a direct physical action can be more efficient and reliable than interactions with a graphical user interface. For example, using the knob on a computer's speaker to adjust its loudness is more easily accomplished than finding and adjusting a slider in a control window.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

Operation of the presentation control systems and methods according to this invention reduce the amount of attention required from a presenter to maintain an electronic system supporting the presentation, while allowing immediate access to an array of presentation aids with differing formats. A presenter generates a set of presentation aids, or elements, such as a slide show, to supplement a presentation to be given to an audience. The presenter can then associate at least one tangible sensible object, such as a card carrying a sensible code or other identification element, with at least one presentation aid element of the presentation as described in co-pending U.S. patent applications Ser. No. 09/152,677 filed Sep. 14, 1998now U.S. Pat. No. 6,195,093, and Ser. No. 09/393,962, filed Sep. 10, 1999, each incorporated herein by reference in their entirety. The presenter thus possesses physical objects that correspond to the presentation elements. To display the presentation elements, such as slides, the presenter presents an object, such as one of the cards, to a sensor of the presentation system which causes the presentation system to retrieve and display the slide corresponding to the selected card to, for example, an audience.

In conjunction, or supplemental to, the physical objects corresponding to presentation elements, the presenter can also generate, or input, context control identification devices for the presentation. This context control information can then be applied, similarly to the physical objects corresponding to the presentation elements, to manipulate the display characteristics of the presentation elements, or slides, of the presentation. Thus, as each presentation element is prepared for display to, for example, an audience, the systems and methods of this invention modify the context of the presentation element based on a style chosen by the presenter. Each modified presentation element is then presented, via a presentation display device, while maintaining a specific appearance or display characteristic.

To present the presentation elements of the presentation with a specific context or display characteristic, the user introduces one of the tangible, sensible identification-carrying devices into the sensible area of a sensor of the presentation control system of this invention. In response to sensing the tangible sensible identification-carrying device, the user has a variety of options for manipulating the style of the sensed presentation element associated with the tangible, sensible identification-carrying device. Specifically, the presentation control system manipulates the presentation element in accordance with the style selected by the presenter and presents the updated presentation element with a modified display characteristic on a presentation display device. In this manner, the presenter's attention can be redirected from the presentation system and especially away from the user interface and to an audience.

Figure 1:
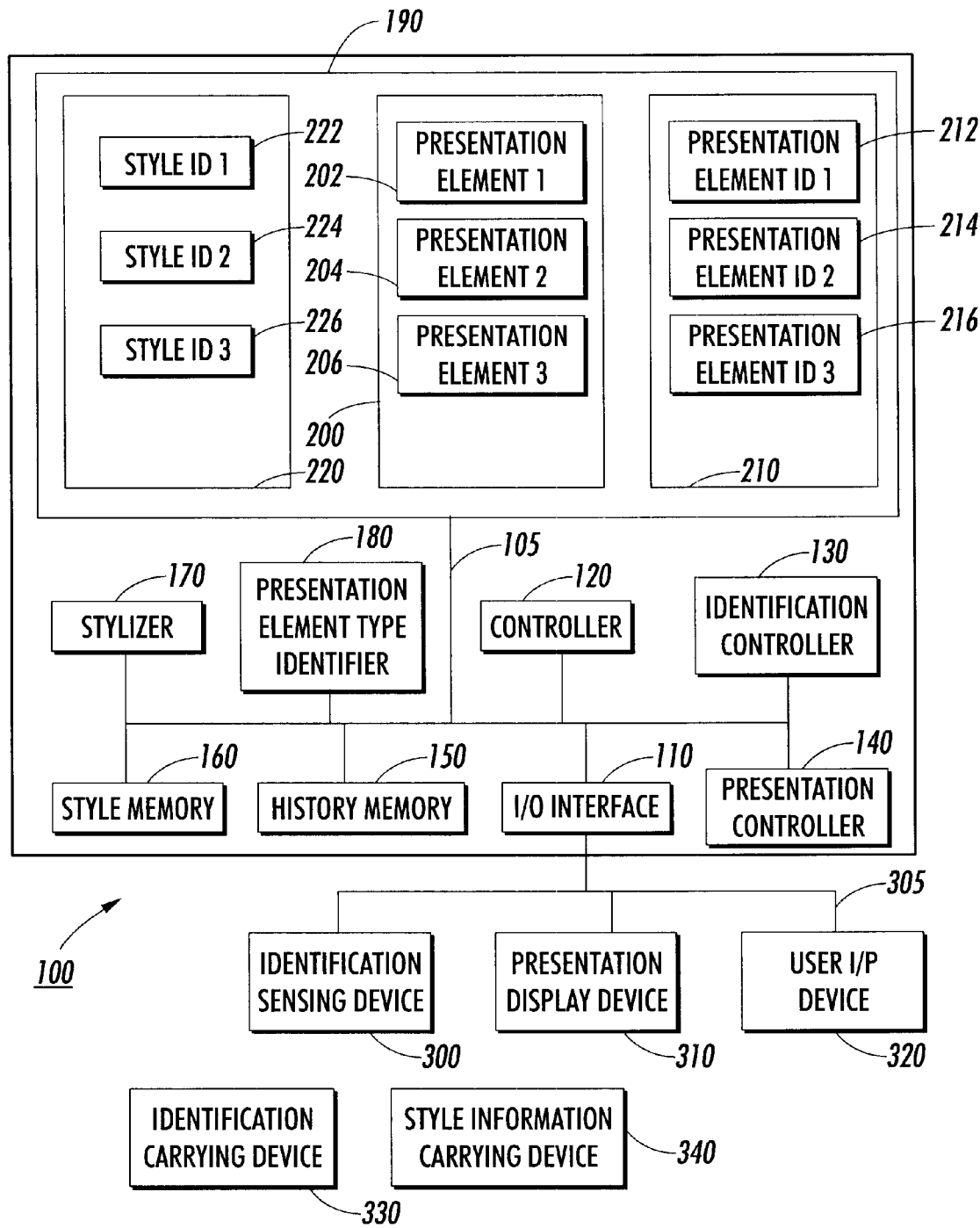
FIG. 1 is a functional block diagram showing a first embodiment of the presentation system according to this invention.

FIG. 1 illustrates one embodiment of the components of a presentation control system 100 used during a presentation. The presentation control system 100 includes an I/O interface 110, a controller 120, an identification controller 130, a presentation controller 140, a history memory 150, a style memory 160, a stylizer 170, a presentation element type identifier 180, a style memory portion 220 with style identifications 222–226, a presentation element memory portion 200 with presentation elements 202–206, and a presentation element identification memory portion 210 with presentation element identifiers 212–216, all stored in memory 190, an identification sensing device 300, a presentation display device 310, a user input device 320, one or more tangible sensible identification-carrying devices 330, one or more tangible sensible style identification-carrying devices 340 and links 105 and 305.

The systems and methods of this invention will be described in relation to an embodiment in which tangible sensible identification-carrying devices are presented to the presentation control system 100. The presentation control system 100 then retrieves presentation elements corresponding to a presentation element identifier that is sensed from the tangible sensible identification-carrying device. However, it should be appreciated that the systems and methods of this invention will work equally well on any known, or later developed, presentation control system. For example, a user need not select a presentation element for presentation with the use of a tangible, sensible identification-carrying device. Alternatively, the user can use an input device, such as a keyboard, a mouse, or a voice recognition system, to control the retrieval, and subsequent display, of a presentation element.

Therefore, while the embodiments described herein are directed toward dedicated systems and methods for controlling a presentation, the systems and methods of this invention could be incorporated by one of ordinary skill in the art into any known or later developed presentation control system.

Once the tangible sensible identification-carrying devices 330 have been produced, for example by the systems and methods described in co-pending U.S. patent applications Ser. No. 09/156,677 or Ser. No. 09/393,962, a user can use the identification-carrying devices 330 during a presentation. The particular tangible sensible identification-carrying device 330 for a desired presentation element is identified by the user based on the mnemonic for that presentation element that is attached to, or otherwise associated with, one of the tangible sensible identification-carrying devices 330. That tangible sensible identification-carrying device 330 is placed, at least momentarily, in the sensible area of the identification sensing device 300. The identification sensing device 300 outputs, via the I/O interface 110 and the link 305, the presentation element identifier associated with that particular tangible sensible identification-carrying device 330. The identification controller 130 associates the presentation element identifier information received from the identification-carrying device 330 with a particular presentation element based on the presentation element identifier stored in the presentation element identification memory portion 210. The identification controller 130 then outputs a signal to the presentation controller 140 indicating the selected presentation element. The presentation controller 140 retrieves, via the link 105, a particular presentation element indicated by the received signal.

The user is then queried whether a style, or certain display characteristic, should be applied to the particular presentation element. If a style is not desired, a signal representing the selected presentation element is output via the link 105, the I/O interface 110 and link 305 to the presentation display device 310 and displayed.

Otherwise, if the user desires a style to be associated with one or more presentation elements, the presentation element type identifier 180 determines the format of the particular presentation element. For example, presentation element types may be in a POWERPOINT® format by Microsoft, a PERSUASION® format by Adobe, a CORELSHOW® format by Corel, or an image element such as a GIF, JPEG, bitmap, or the like, or any other known or later developed format that can be used in conjunction with a presentation. The presentation element type identifier 180 queries the style memory 160 to determine if attribute tags, i.e., information that identifies display characteristics of the presentation, such as background color or the like, for that particular presentation format are available. If attribute tags for the particular presentation element are available, the presentation system 100 assembles a list of predetermined available styles for selection by the user. An example of available styles that can be applied to a particular presentation element are of background color, background texture, background image, presentation element transition, font, font size, font spacing, font color, font family, font style, word spacing, letter spacing, text alignment, text indent, line spacing, bullet style, bullet size, bullet color, list style, presentation element orientation, presentation element display time, presentation element size, border color, border width, visual effect, audio effect, design selection, template selection or any other style which affects the context or display characteristics of the presentation element. Upon selecting a style, via, for example, the user input device 320, such as a mouse, keyboard, voice control system, or the like, or through the use of a style identification-carrying device 340, the stylizer 170 applies the selected style to the presentation element(s).

Alternatively, if the user desires a particular style that is not indicated as being available based on data stored in style memory 160 for the particular detected presentation element type, the user can enter, via user input device 320, or retrieve, for example, from a database or data source collocated or remote from the presentation control system 100, a custom style. As previously noted, the examples discussed above are illustrative in nature and are not intended to limit the scope or combination of styles that can be applied to any particular presentation element type.

The stylizer 170 applies the selected or custom style to the presentation element with the cooperation of controller 120. In particular, the stylizer 170 compares the detected presentation element type to a presentation element attribute table, which can be stored in style memory 160. If the presentation element attribute table for the particular presentation element type contains attribute tags which correspond to the attribute tags affected by the style selection of the presenter, the stylizer 170 replaces the attributes of the tags with new attributes that correspond to the selected style. For example, if the presentation element type is a product of a well known presentation authoring system, the presentation element will contain tags, or identifiers, e.g., function calls, followed by attributes that describe various features of the presentation element. Table 1 illustrates some of the common tags used to identify attributes within a presentation element.

TABLE 1

| | | |
|---|---|---|
| | PRESENTATION ELEMENT TYPE | |
| ATTRIBUTE | PowerPoint ® API Access to Attribute Visual Basic Function Call(s): | HTML Tag and Cascading Style Sheet Access to Attribute HTML Tag(s) listed first; CSS properties listed next |
| background color | ActiveWindow.Selection.SlideRange .Background.Fill.ForeColor.RGB value | <body bgcolor=#XXXXXX> CSS background-color: <value> |
| background image | ActiveWindow.Selection.SlideRange .Background.Fill.UserPicture "C:\pic.bmp" | <body background = "filename.gif"> CSS background-image: <value> |
| background texture | ActiveWindow.Selection.SlideRange .Background.Fill.Patterned value ActiveWindow.Selection.SlideRange .Background.Fill.PresetTextured value | <body background="filename.gif"> CSS background-image: <value> |

TABLE 1-continued

| ATTRIBUTE | PRESENTATION ELEMENT TYPE | |
|---|---|---|
| | PowerPoint ® API Access to Attribute Visual Basic Function Call(s): | HTML Tag and Cascading Style Sheet Access to Attribute HTML Tag(s) listed first; CSS properties listed next |
| font family | ActiveWindow.Selection.TextRange.Font.Name = "font-name" | <FONT FACE="facename1, facename2 ... "> CSS font-family:<name> |
| font style | ActiveWindow.Selection.TextRange.Font.Bold = msoTrue ActiveWindow.Selection.TextRange.Font.Emboss = msoTrue ActiveWindow.Selection.TextRange.Font.Italic = msoTrue ActiveWindow.Selection.TextRange.Font.Shadow = msoTrue ActiveWindow.Selection.TextRange.Font.Subscript = msoTrue ActiveWindow.Selection.TextRange.Font.Superscript = msoTrue ActiveWindow.Selection.TextRange.Font.Underline = msoTrue | <B></B> <BLINK></BLINK> <CITE> </CITE> <CODE> </CODE> <EM> </EM> <I></I> <KBD> </KBD> <LISTING> </LISTING> <PLAINTEXT></PLAINTEXT> <SAMP> </SAMP> <STRIKE> </STRIKE> <STRONG> </STRONG> <SUB> </SUB> <SUP> </SUP> <TT> </TT> <U> </U> <VAR> </VAR> CSS font-style: <value> font-variant: <value> font-weight: <value> text-transform: <value> text-decoration: <value> vertical-align: <value> |
| font size | ActiveWindow.Selection.TextRange.Font.Size = value | <BASEFONT SIZE=number> <BIG> </BIG> <FONT SIZE=+1></FONT> <SMALL> </SMALL> CSS font-size: <value> |
| font color | ActiveWindow.Selection.TextRange.Font.Color.RGB = value | <FONT COLOR=FFFFFF></FONT> CSS color: <color> |
| word spacing | Adjust by font change | CSS word-spacing: <value> |
| letter spacing | Adjust by font change | CSS letter-spacing: <value> |
| line spacing | With ActiveWindow.Selection.TextRange.ParagraphFormat .LineRuleWithin = msoTrue .SpaceWithin = value End With | CSS line-height: 200% |
| text align | ActiveWindow.Selection.TextRange.ParagraphFormat.Alignment = value | <CENTER></CENTER> <P ALIGN=alignment> CSS text-align: <value> |
| text indent | ActiveWindow.Selection.ShapeRange.TextFrame.MarginLeft = value ActiveWindow.Selection.ShapeRange.TextFrame.MarginRight = value ActiveWindow.Selection.ShapeRange.TextFrame.MarginTop = value ActiveWindow.Selection.ShapeRange.TextFrame.MarginBottom = value | <DFN></DFN> <FRAME MARGINWIDTH=number> <FRAME MARGINHEIGHT=number> CSS text-indent: <value> border-bottom-width: <value> border-bottom: <value> border-color: <value> border-left-width: <value> border-left: <value> border-right-width: <value> border-right: <value> border-style: <value> border-top-width: <value> border-top: <value> border-width: <value> border: <value> clear: <value> |

TABLE 1-continued

PRESENTATION ELEMENT TYPE

| ATTRIBUTE | PowerPoint ®<br>API Access to Attribute<br>Visual Basic Function Call(s): | HTML<br>Tag and Cascading Style<br>Sheet Access to Attribute<br>HTML Tag(s) listed first;<br>CSS properties listed next |
|---|---|---|
| | | float: <value><br>height: <value><br>margin-bottom: <value><br>margin-left: <value><br>margin-right: <value><br>margin-top: <value><br>margin: <value><br>padding-bottom: <value><br>padding-left: <value><br>padding-right: <value><br>padding-top: <value><br>padding: <value><br>width: <value> |
| list style | ActivePresentation.ApplyTemplate<br>FileName:="C:\file.dot" | CSS<br>list-style-type: <value><br>list-style-position: <value> |
| bullet for list | ActiveWindow.Selection.TextRange<br>.ParagraphFormat.Bullet.Character = value | <LI DINGBAT=" name"></LI><br><LI TYPE=type> </LI><br><LI VALUE=number> </LI><br>same for <OL> and <UL> tags<br>CSS<br>list-style-image: <value> |
| visual effect | ActiveWindow.Selection.SlideRange<br>.SlideShowTransition.EntryEffect = value | <MARQUEE behavior="slide"<br>direction = "left, right, up, or<br>down" LOOP=1> |
| audio effect | ActiveWindow.Selection.SlideRange<br>.SlideShowTransition.SoundEffect<br>.Name= value | <BGSOUND SRC="URL"> |
| design/template<br>selection | ActivePresentation.ApplyTemplate<br>FileName:="C:\file.dot" | Apply a CSS using<br>CLASS='name' tag to different<br>HTML elements<br>Or <LINK REL=StyleSheet<br>HREF="style.css"<br>TYPE="text/css"> |

For example, for a PowerPoint® presentation element, the background color will be identified by the ActiveWindow.Selection.SlideRange.Background.Fill.ForeColor.RGB value tag. Alternatively, the background color tag for an HTML presentation element will be identified by the <body bgcolor=#XXXXXX>tag.

The stylizer 170 then replaces the attributes of tags with the new attributes that correspond to the selected style.

However, if there are no tags present in the presentation element that correspond to the currently selected style attributes, the stylizer 170 updates the global presentation context style attributes. This allows all presentation elements within the presentation to be aligned with the currently selected style attribute.

In particular, and for example, if the presentation element is a bitmap image, and the user has requested a particular background color to unify the presentation, the stylizer 170, in cooperation with the presentation controller 140, outputs a modified presentation element to the presentation display device 340. The presentation display device will show the bitmap image superimposed on, for example, a blue background.

Therefore, the area surrounding the presentation element will be affected by the selected style, but not the image itself. Hence, these context style attributes can be applied to global display characteristics of the presentation element.

Then, upon updating the display characteristics of the presentation element, a signal representing the stylized presentation element is then output via the link 305 and the I/O interface 110 to the presentation display device 310 and displayed.

Alternatively, in a more complicated example, if the presentation element is a presentation slide of a PowerPoint® containing, for example, text boxes, and the user has requested a particular font and font size to unify the presentation, the stylizer 170, in cooperation with the presentation controller 140, outputs a modified presentation element to the presentation display device 340. The presentation display device 340 will show the updated presentation element containing the new font size and style.

In particular, a user can, for example, select a style that indicates all presentation elements should be displayed in, for example, New Times Roman font with a font size of 14 point. Upon selection of a presentation element, the system will determine a first text box within the presentation element and retrieve its identification. Then, in order to maintain the spatial relationship existing in the presentation element, a determination will be made as to whether the text box has a border, or frame. If a border is present, the system retrieves the dimensions for the text box and records them in association with the text box identifier. The stylizer 170 then applies the new font size and shape to the text within the selected text box.

If the text box has a border, the stylizer 170 will retrieve the saved text box identifier and dimensions previously stored. If after the new font size and shape attributes have been applied to the selected text box, the borders are larger than the stored borders, the stylizer 170 will decrease the font size accordingly until the original boundary size is restored. Alternatively, if the text box boundaries are smaller than the original stored text box boundaries, the stylizer 170 will proportionally increase the font size to achieve the same size text box that appeared in the original presentation. Thus, the spatial relationships between the text boxes are maintained. This process can continue until each text box has been subjected to the new style attribute.

However, it should be appreciated, that the spatial relationships with a presentation element may not be critical. Therefore, if, for example, the spatial relationships within a presentation element are irrelevant, a user could alternatively force all text to a particular font or font size in accordance with the user's selected, or customized style attribute.

Additionally, the stylized presentation element, along with any associated style identification, is stored in, or in a combination of, the memory 190 and the history memory 150. This allows the presentation system 100 to track at least one previous style that has been applied to at least one particular presentation element.

The presentation control system 100 works equally well for presentations that have been stored with an associated style identification. For example, if an exemplary presentation has one or more presentation elements 202–206, those presentation elements are identified by corresponding presentation element identifiers 212–216, respectively. Furthermore, each of those presentation elements 202–206 has an associated style identification 222–226, respectively. These style identifications 222–226 correspond to previous styles that were associated with the respective presentation element 202–206. Therefore, when subsequently displaying a particular presentation element, the presentation controller 140 can query the memory 190 to determine if a style identifier is associated with the selected presentation element. If a style identifier is associated with the selected presentation element, the presentation controller 140 can retrieve the previously stored style information and forward a signal representing the selected presentation element and associated style to the presentation display device 310.

Alternatively, after the presentation control system 100 has associated the identifier from the identification-carrying device 330, or user input device 320, with a particular presentation element, the presentation control system 100 can query the user whether a style is to be applied to the selected presentation element. If no style is desired for the selected presentation element, a signal representing the selected, unmodified presentation element is output via the link 305 and I/O interface 10 to the presentation display device 310 and displayed.

However, if a style is to be applied to the selected presentation element, the presentation element type identifier 180 identifies the presentation element type. Alternatively, the identification controller 130 determines whether any style information is currently associated with that particular presentation element. Therefore, the presentation control system 100 can determine if styles have been previously associated with the presentation element. Furthermore, the presentation control system 100 can determine if the user has selected a style to be applied generically to one or more particular presentation element types. If a particular style is associated with the selected presentation element, or the presentation element type matches a flag set by the user indicating all elements of this type are to have a particular style, the associated style attributes can be displayed to the user. The user then has the option of applying a new style to the selected presentation element, or, alternatively, displaying the presentation element using the previously associated style information.

While the above-described embodiments require user input to associate style information with a particular presentation element(s), the presentation control system 100 is also capable of operating in an "auto stylize" mode. Upon being placed in this mode, the presentation control system 100 receives a request to display a particular presentation element. Upon receiving this request, the presentation element type identifier 180, in conjunction with the controller 120, determines if a style has previously been associated with the selected presentation element. If an associated style for the selected presentation element is not available, the stylizer 170, in conjunction with the presentation element type identifier 180, analyzes the presentation element to create a style based on that presentation element's display characteristics. For example, if the requested presentation element is an HTML file with a white background and an element transition of, for example, fade in/out, the stylizer 170 creates a style based on the display characteristics of the requested presentation element. For example, the stylizer 170 can query the presentation element and identify the attributes associated with the "Background" and "Transition" tags. The attributes of these tags are then associated with a new style having, for example, a white background and transition of fade in/out. Therefore, this created style can be used, and applied to, subsequently requested presentation elements, with or without interaction on the user's part.

Furthermore, the user can establish a half-automatic, half-manual mode of operation. For example, the user can identify that only certain display characteristics be queried by the stylizer 170. If the stylizer 170 finds attributes associated with the limited set of display characteristics, the stylizer 170 creates a custom style based on the attributes associated with those display characteristics. However, if none of the limited set of display characteristics are found in the requested presentation element, the presentation control system 100 could default to, for example, a predefined background color with no transition parameters.

However, it should be appreciated that because a style has been previously associated with a presentation element, the user is not required to use that style for display of the presentation element. Alternatively, the user can select a style from the available styles based on the detected element type, or create a custom style, as described above.

Furthermore, the tangible sensible identification-carrying device 330 can be any device capable of carrying the mnemonic relating to the presentation element associated with the presentation element identifier contained in that tangible sensible identification-carrying device 330. Additionally, the tangible sensible identification-carrying device 340 can be any device capable of carrying a mnemonic relating to a style identification that can be applied to a particular presentation element.

The tangible sensible identification-carrying device 330 and the style identification-carrying device 340 need not be limited to printed media. Alternatively, the tangible sensible identification-carrying device and the style identification-carrying device can be a physical device such as a microchip or other device capable of carrying information based on its mechanical, electrical, or magnetic properties. For example, a tangible sensible identification-carrying device and/or style identification-carrying device can be an ultrasonic transmitter and the identification sensing device an ultrasonic receiver. Upon placing the ultrasound emitting identification-carrying device in the sensible area of the identification sensing device 300, the identification sensing device reads the presentation element identifier, or style identification, respectively, from the identification-carrying device.

Alternatively, the tangible sensible identification-carrying device 330 and style identification-carrying device 340 can maintain, transmit or respond to an electric or magnetic field. The identification sensing device 300 would then produce an electromagnetic field into which the identification-carrying device 330 can be placed. When the identification-carrying device is placed in a sensible area of the identification sensing device, the identification-carrying device becomes capacitively, inductively or otherwise electromechanically coupled to the identification sensing device, and the identification can be extracted from the identification-carrying device and correlated to the particular presentation element identifier or style identifier.

Furthermore, one of the identification-carrying devices can be a chip and the identification sensing device a chip reader. In this embodiment, the chip, when placed in the sensible area of the identification sensing device could then be read and interpreted by the presentation control system 100.

Alternatively, the systems and methods of this invention, as previously described, work equally well in conjunction with known, or later developed, presentation authoring and displaying systems. In this example, a user can implement traditional techniques, for example selecting entries with a keyboard and/or mouse, to select a presentation element and/or a desired style.

In summary, the identification-carrying device 330, the style identification-carrying device 340, the identification sensing device 300 and the user input device 320 can be any device, or combination of devices, which is capable of receiving a user's selection of a presentation element, and/or style to be applied thereto.

Furthermore, the style identification-carrying device 340 and identification-carrying device 330 can be incorporated into one tangible sensible identification-carrying device. Additionally, more than one style or presentation element can also be associated with a single tangible sensible identification-carrying device.

The presentation display device 310 can be any device capable of displaying electronic media or multimedia to an audience, such as an overhead projector, a large screen TV, a video projector, a slide projector, or the like.

The links 105 and 305 can be a wired or wireless link or any known or later developed element that is capable of supplying electronic data to and from the connected elements.

Figure 2:
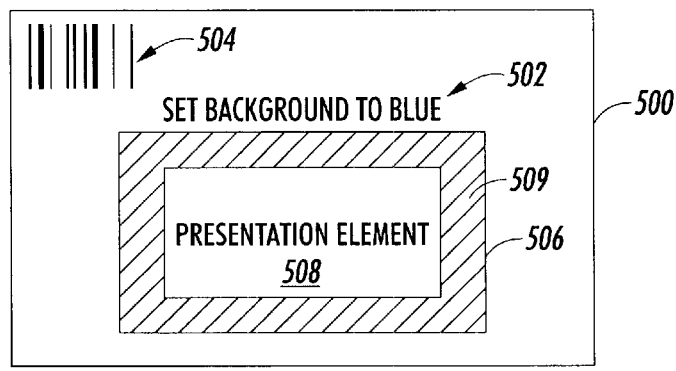
FIG. 2 shows a first exemplary context identification-carrying device.
Figure 3:
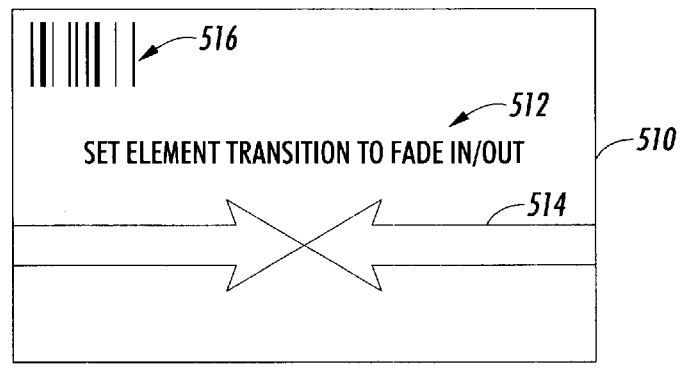
FIG. 3 illustrates a second exemplary context identification-carrying device.
Figure 4:
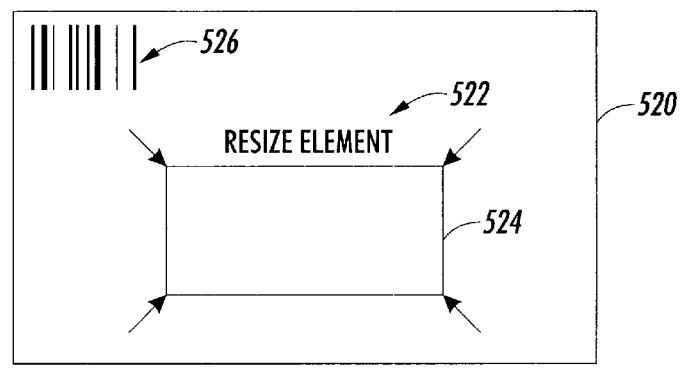
FIG. 4 illustrates a third exemplary context identification-carrying device.

One particular exemplary embodiment of a tangible sensible identification-carrying device is a card containing a thumbnail image forming the mnemonic where the thumbnail image represents a particular presentation element, or style, and at least one barcode forming the presentation element identifier, or style, respectively. While the presentation system 100 of this invention is by no means limited to this particular exemplary embodiment, this example is chosen for its simplicity. This exemplary embodiment uses a barcode scanner as the identification sensing device 300 and a card, such as a 3×5 card as the identification-carrying, or style identification-carrying device. A printer, for example at the direction of the user and/or the presentation control system, produces a printed card or page, i.e., the tangible sensible identification-carrying device or style identification-carrying device, as described in co-pending U.S. patent application Ser. No. 09/152,677 now U.S. Pat. No. 6,195,093. The tangible sensible identification-carrying devices contain a barcode representing the identifiers printed on the card or page. A thumbnail image representing the identifiers as the mnemonic, is also printed on the card. FIGS. 2–4 illustrate exemplary printed cards that the inventors have developed as exemplary style identification-carrying devices 340.

Specifically, FIGS. 2–4 illustrate how exemplary style identification-carrying devices 340 may appear. FIG. 2 illustrates an exemplary style identification-carrying device 500 for setting the background in the presentation to blue. The style identification-carrying device 500 comprises a mnemonic 502 corresponding to the style identified in the barcode 504. Additionally, the style identification-carrying device 500 contains a graphical mnemonic 506 which shows an exemplary presentation element 508 superimposed on a blue background 509. Upon presenting this style identification-carrying device 500 to the identification sensing device 300, at least the current presentation element is associated with a style element that directs the presentation control system to display a blue background.

FIG. 3 illustrates an exemplary style identification-carrying device 510 that controls the display characteristics for the introduction of the presentation element on the presentation display device 310, and the transition of that presentation element to another presentation element, or close of the presentation. As in FIG. 2, the style identification-carrying device 510 comprises a textual mnemonic 512, a graphical mnemonic 514 and a barcode 516 corresponding to the identification of the particular style stored in style memory 160. The style identification for this style identification carrying device directs the presentation control system to fade-in a requested presentation element, and fade-out the requested presentation element when a new presentation element is requested or the presentation closed.

FIG. 4 illustrates another exemplary style identification-carrying device 520 that modifies the presentation element to a predetermined size. In particular, the style identification-carrying device comprises a textual mnemonic 522, a graphical mnemonic 524 and a barcode representing the style identification 526. Upon selection of the style represented in this style identification-carrying device, the stylizer 170 reduces or enlarges, as appropriate, the presentation element to the size defined by the style attributes.

As shown in FIGS. 2–4, the barcode, as a style identifier, is associated with one or more mnemonics relating to a particular style identification-stored in style memory 160. However, it should be appreciated that the style identifier need not be linked to a particular style resident on the presentation control system 100. To the contrary, the style identifier identifies any style, or set of styles, in any presentation. For example, the style identifier can be, for example, a hyperlink, a file name, a page number, a uniform resource locator (URL), a full text search keyword or other query syntax, a database address and/or a path to a particular memory location inside or outside of the presentation control system. It should be understood that the style identifier is in no way limited to identifying a particular style in one particular loaded presentation, or present on the presentation control system, but can also be a path to at least one memory location containing at least one style to be applied to at least one presentation element. The only requirement of the style identifier is that it contain sufficient information that the presentation control system can, possibly along with static information, identify the desired style. Such static information can be, for example, the current presentation of the current presentation element being displayed.

Figure 5:
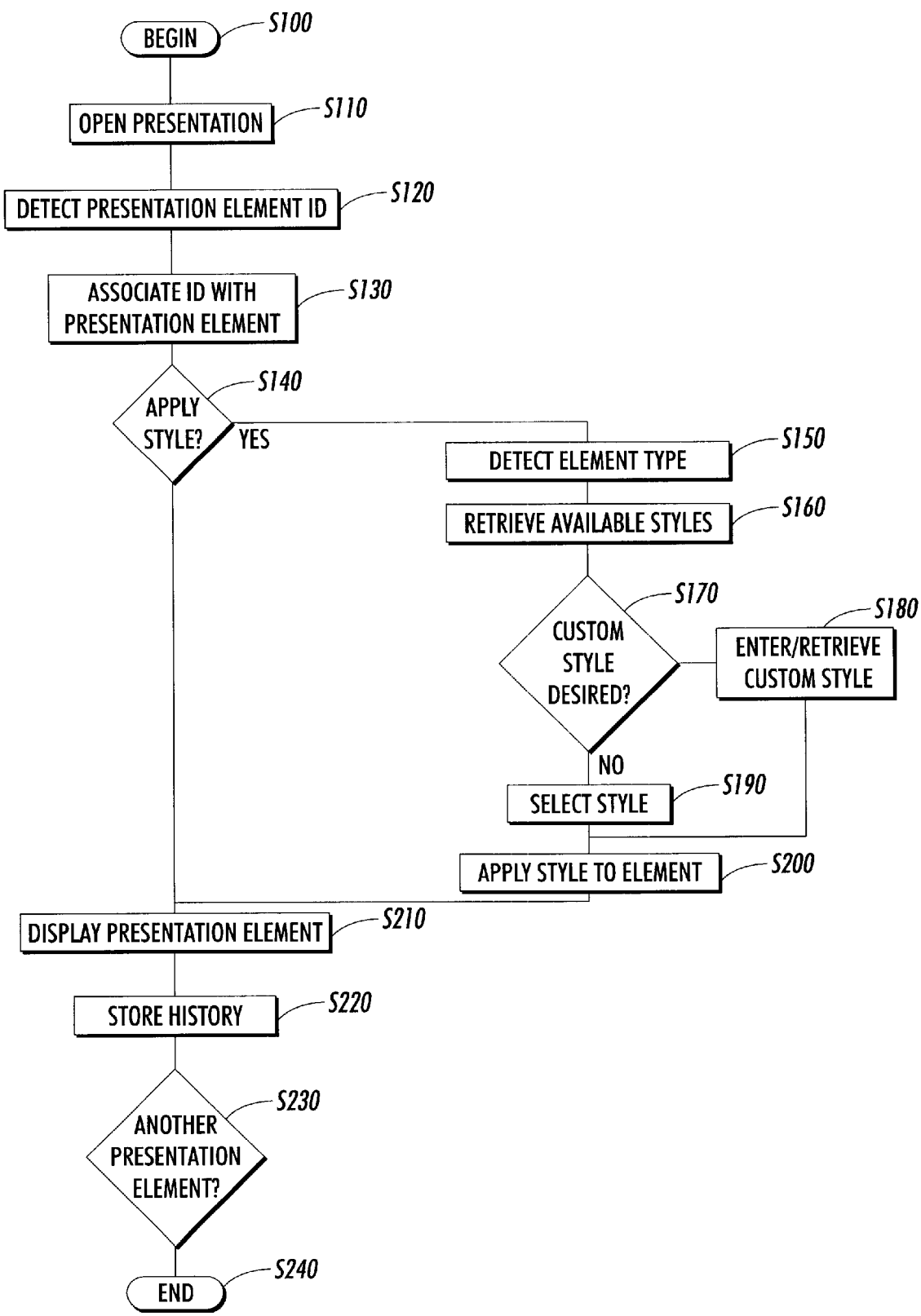
FIG. 5 is a flowchart outlining one exemplary embodiment of a method for controlling the context of presentation elements during a presentation.

FIG. 5 is a flowchart outlining one embodiment of a method for applying a style to a presentation element according to this invention. Control begins in step S100, and continues to step S110, where a presentation is opened. Next, in step S120, a request by the user for a presentation element is detected. Then, in step S130, the presentation element identifier is associated with a particular presentation element. Control then continues to step S140.

In step S140, a determination is made whether a style should be applied to the selected presentation element. If a style is to be applied to the selected presentation element, control continues to step S150. Otherwise, control jumps to step S210.

In step S150, the type of the presentation element is detected. Then, in step S160, the style available for the detected element type are retrieved. Next, in step S170, the user is queried whether a custom style is desired, as opposed to the styles retrieved that correspond to the detected element type. If a custom style is desired, control continues to step S180. Otherwise, control jumps to step S190.

In step S180 the user enters, or retrieves, the style to be applied to the particular presentation element. Control then jumps to step S200. In contrast, in step S190, a style is selected by the user from the available style retrieved and corresponding to the detected presentation element type. Control then continues to step S200.

In step S200, the style information is applied to the particular presentation element. Next, in step S210, the presentation element is displayed. Then, in step S220, the history information, as well as any corresponding style identification information, is stored. Next, in step S230, the user is queried whether another presentation element is to be presented. If another presentation element is desired for presentation, control jumps back to step S120. Otherwise, control continues to step S240, where the control sequence ends.

Figure 6:
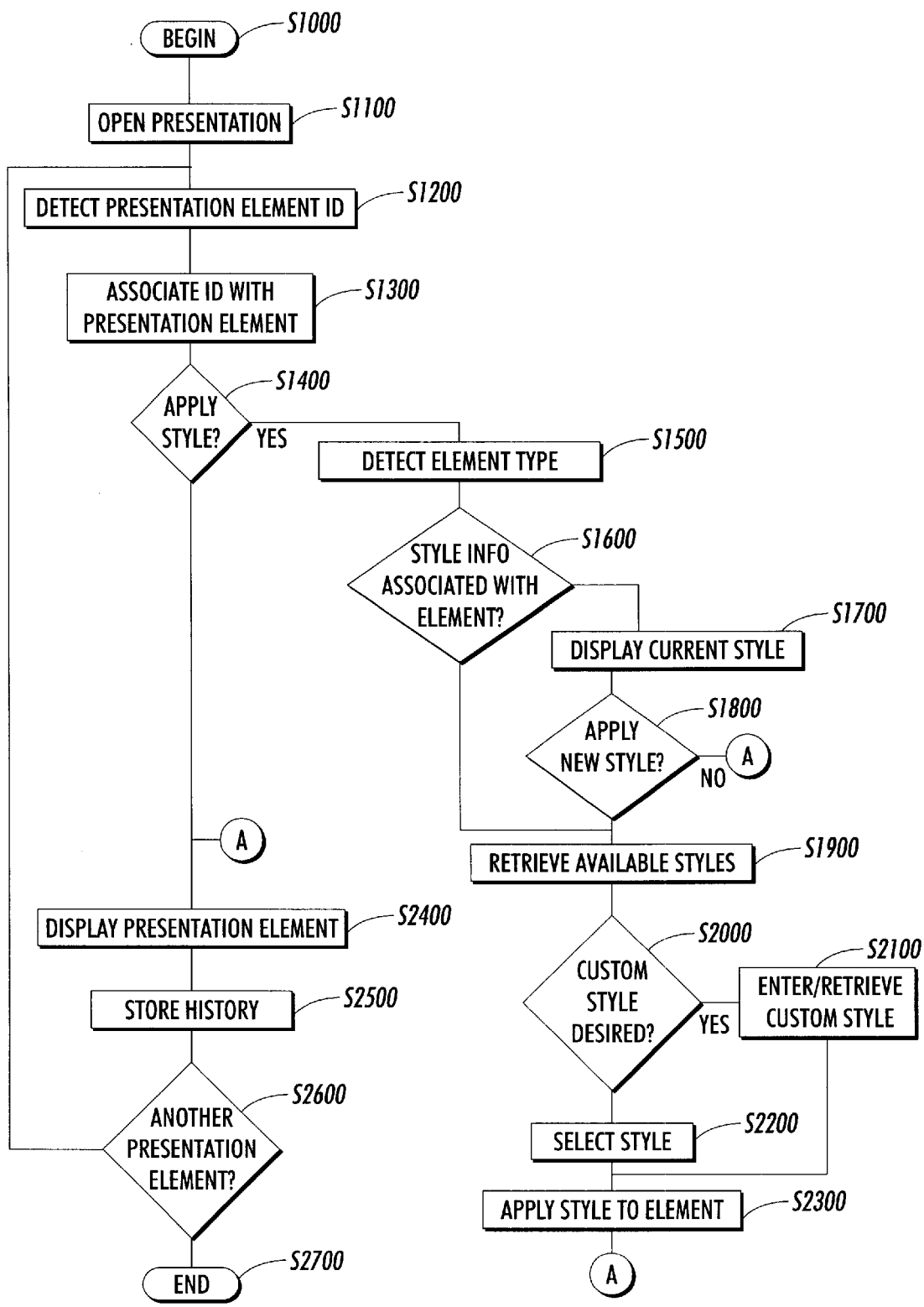
FIG. 6 is a flowchart outlining one exemplary embodiment of a method for controlling the context of a stored presentation according to this invention.

FIG. 6 is a flowchart outlining one exemplary embodiment of a presentation method used in conjunction with stored presentation elements that may, or may not, already have associated styles. Control begins in step S1000 and continues to step S1100, where a presentation is opened. Next, in step S1200, a presentation element identifier is received and detected. Then, in step S1300, the presentation element identifier is associated with a particular presentation element. Control then continues to step S1400.

In step S1400, a determination is made whether any style information should be applied to the requested presentation element. If style information should be applied to the element, control continues to step S1500. Otherwise, control jumps to step S2400.

In step S1500, the presentation element type is detected. Next, in step S1600, a determination is made whether any style identification information is currently associated with that particular presentation element type. If a style is currently associated with the presentation element, control continues to step S1700. Otherwise, control jumps to step S1900.

In step S1700, the style information associated with the presentation element is displayed. Next, in step S1800, a determination is made whether to apply a new style. If a new style is to be applied, control continues to step S1900. Otherwise, if the currently associated style is to be used, control jumps to step S2400.

In step S1900 a list of available styles is retrieved based on the detected element type. Next, in step S2000, a determination is made whether a custom style is desired. If a custom style is desired, control continues to step S2100. Otherwise control jumps to step S1450. Instep S1422, the custom style is entered by a user, or retrieved from a database. Control then continues to step S2300.

In contrast, in step S2200, a style is selected from the available styles list. Then, in step S2200, this style is applied to the selected presentation element. Control then continues to step S2400.

In step S2400, the presentation element, modified by the selected style, if appropriate, is displayed. Next, in step S2500, the history and/or style information associated with the displayed presentation element is stored. Then, in step S2600, a determination is made whether another presentation element is desired for presentation. If another presentation element is desired for presentation, control jumps back to step S1200. Otherwise, control continues to step S2700, where the control sequence ends.

It should be appreciated that it is not necessary to detect the element type in step S1500. Alternatively, for reasons of computational efficiency, or if styles are associated with a particular element, as opposed to a particular element type, step S1500 can be eliminated.

Figure 7:
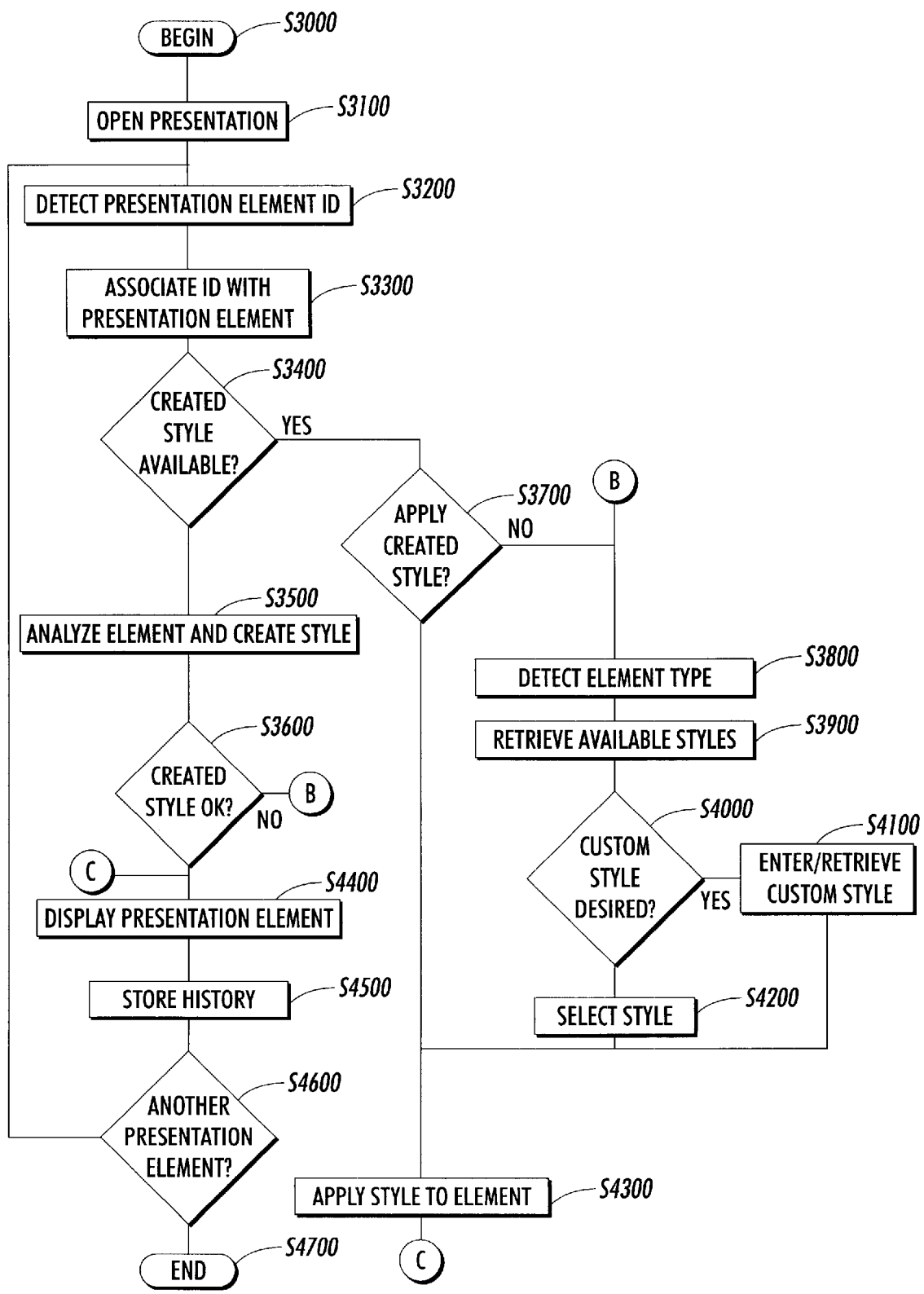
FIG. 7 is a flowchart outlining one exemplary embodiment of a method for automatically controlling the context of a presentation according to this invention.

FIG. 7 is a flowchart outlining one exemplary embodiment of an "auto stylize" method for controlling style information in accordance with this invention. Control begins in step S3000, and continues to step S3100 where a presentation is opened. Then, in step S3200, an input presentation element identifier is detected. Next, in step S3300, a presentation element is associated with the input presentation element identifier. Control then continues to step S3400.

In step S3400, a determination is made whether a style is associated with the selected presentation element. If a style is currently associated with the selected presentation element, control jumps to step S3700. Otherwise, control continues to step S3500. In step S3500, when style information is not currently associated with the selected presentation element, the presentation element is analyzed to create a style based on that particular element's display characteristics. Next, in step S3600, a determination is made whether the created style is acceptable. If the created style is not acceptable, control jumps to step S3800 where a new style can be selected or input. Otherwise, control jumps to step S4400.

In step S3700, a determination is made whether the associated style should be applied to the selected presentation element. If the associated style is to be applied to the selected presentation element, control jumps to step S4300. Otherwise, control continues to step S3800. Alternatively, the style may already have been applied to or associated with the selected presentation element. In this case, control would jump directly to step S4400 to display the presentation element.

In step S3800, the presentation element type is detected. Then, in step S3900, a list of available styles available for the detected presentation element are displayed, or summarized for a user. Next, in step S4000, a determination is made whether a custom style, other than the listed available styles, is desired. If a custom style is desired, control continues to step S4100. Otherwise, control jumps to step S4200. In step S4100 the user enters, or retrieves, custom style identification information. Control then continues to step S4300. In contrast, in step S4200, a style is selected from the available styles list, or, for example, from a menu. Control then continues to step S4300.

In step S4300, the style is applied to the presentation element. However, it should be appreciated that the method need not reapply the style to the presentation element, but can simply retrieve, and display, the already applied style. Control then continues to step S4400.

In step S4400, the presentation element is displayed. Then, in step S4500, the history, and associated style identification information, are stored in relation to the selected presentation element. Next, in step S4600, a determination is made whether another presentation element is desired for presentation. If another presentation element is desired, control jumps back to step S3200. Otherwise, control continues to step S4700 where the control sequence ends.

Figure 8:
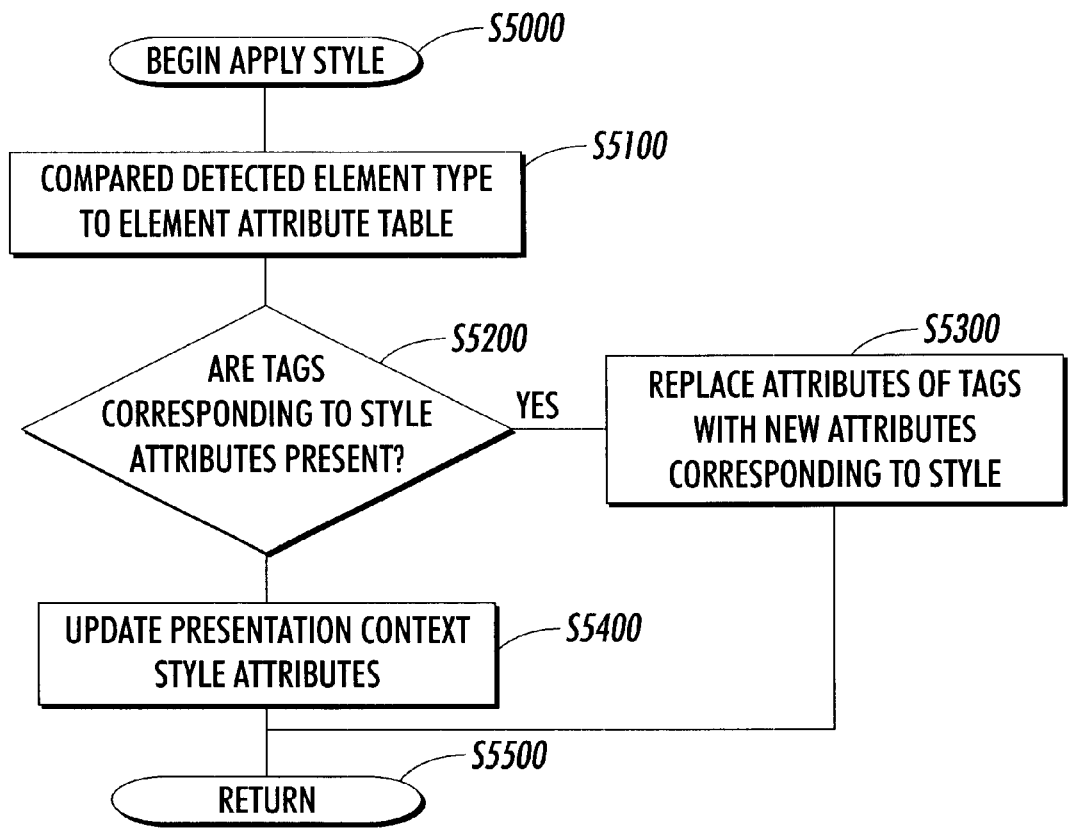
FIG. 8 is a flowchart outlining in greater detail the applied style steps of FIGS. 5–7.

FIG. 8 is a flowchart outlining one exemplary embodiment of the applying style to element step shown in FIGS. 5–7 in greater detail. Control commences in step S5000, and continues to step S5100, where the detected presentation element type is compared to an element attribute table. Then, in step S5200, a determination is made whether tags or identifiers corresponding to the desired style attributes are present. If the tags are present, control continues to step S5300. Otherwise, control jumps to step S5400.

In step S5300, the current attributes of the tags are replaced with new attributes which correspond to the selected style. Control then jumps to step S5500 where the control sequence returns to the main control sequence.

Alternatively, in step S5400, a presentation context style attribute is updated. This presentation context style attribute governs global display characteristics of the presentation element. For example, if the selected presentation element is a bitmap image, the context style attribute can be, for example, a background color, image, texture, or the like, or matting, that surrounds the selected presentation element to fill an entire presentation display device screen. Alternatively, for example, the global context style attribute can be a presentation element transition as previously described. Control then continues to step S5500.

Figure 9:
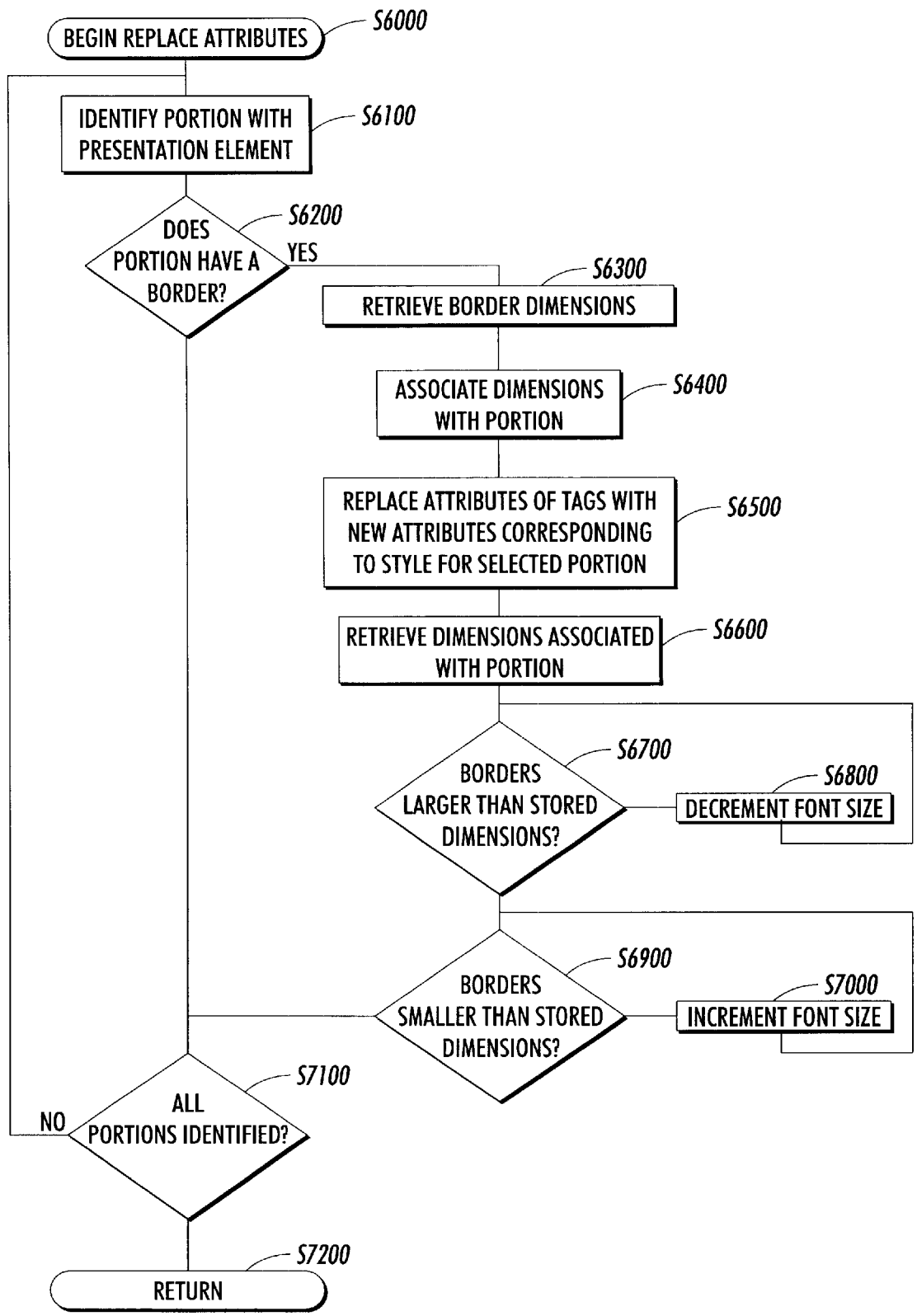
FIG. 9 is a flowchart outlining one exemplary embodiment of a method for controlling font attributes according to this invention.

FIG. 9 illustrates step S5300 of FIG. 8 in greater detail. In particular, FIG. 9 illustrates an embodiment in which portions of the presentation element contain borders. For example, in a PowerPoint® type presentation, text boxes can have borders. This flowchart outlines how the spatial relationships are maintained between portions of a presentation element while still allowing for the attributes to be adjusted in accordance with a selected style.

Control begins in step S6000 and continues to step S6100. In step S6100, a portion, e.g., a text box within a presentation element is identified. Next, in step S6200, a determination is made whether the identified portion has a border. If the identified portion has a border, control continues to S6300. Otherwise, control jumps to step S7100.

In step S6300, the border dimensions for the identified portion are retrieved. Next, in step S6400, the dimensions are associated with the identified portion. Then, in step S6500, the attributes of tags with new attributes corresponding to style for the selected portion are replaced. Control then continues to step S6600.

In step S6600, the current dimensions associated with the selected portion are retrieved. Next, in step S6700, a determination is made whether the borders are larger than the stored original dimensions. If the borders are larger than the stored original dimensions, control continues to step S6800, otherwise control jumps to step S6900. In step S6800, the font size is decremented and control returns to step S6700.

In step S6900, a determination is made whether the borders are smaller than the stored dimensions. If the borders are smaller than the stored dimensions, control continues to step S7000, otherwise control jumps to step S7100. In step S7000, the font size is incremented and control returns to step S6900. Control then continues to step S7100.

In step S7100, a determination is made whether all portions within the presentation element have been identified. If all portions have been identified, control continues to step S7200 where the control sequence ends. Otherwise, control returns to step S6100.

As shown in FIG. 1, the presentation system is preferably implemented either on a single program general purpose computer or separate program general purpose computers, with associated tangible sensible identification-carrying devices. However, the presentation system can also be implemented on a special purpose computer, a programmed microprocessor or microcontroller and peripheral integrated circuit elements, an ASIC, or other integrated circuit, a digital signal processor, hard wired electronic or logic circuit such as a discrete element circuit, a programmable logic device such as a PLD, PLA, FPGA, PAL, or the like. In general, any device, capable of implementing a finite state machine that is in turn capable of implementing the flowcharts shown in FIGS. 5–9 can be used to implement the presentation system.

Furthermore, the disclosed method may be readily implemented in software using object or object-oriented software development environments that provide portable source code that can be used on a variety of computer or work station hardware platforms. Alternatively, the disclosed presentation system may be implemented partially or fully in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The presentation system and methods described above, however, can be readily implemented in hardware or software using any known or later developed systems or structures, devices and/or software by those skilled in the applicable art without undue experimentation from the functional description provided herein together with a general knowledge of the computer arts.

Moreover, the disclosed methods may be readily implemented as software executed on a programmed general purpose computer, a special purpose computer, a microprocessor, or the like. In this case, the methods and systems of this invention can be implemented as a routine embedded in a personal computer, as a resource residing on a server or graphics workstation, as a routine embedded in a dedicated presentation control system, or the like. The presentation system can also be implemented by physically incorporating the system and method into a software and/or hardware system, such as the hardware and software systems of a graphics workstation or dedicated presentation control system.

It is, therefore, apparent that there has been provided, in accordance with the present invention, systems and methods for presenting of stylized presentation elements. While this invention has been described in conjunction with preferred embodiments thereof, it is evident that many alternatives, modifications and variations will be apparent to those skilled in the art. Accordingly, Applicants intend to embrace all such alternatives, modifications and variations that follow in the spirit and scope of this invention.

What is claimed is:

1. A system that maintains consistency throughout a presentation comprising:
   a memory that stores at least one style information corresponding to a style to be applied to a portion of at least one presentation element, the at least one presentation element containing information to be presented;
   a presentation element type identifier that determines a format of the at least one presentation element, wherein the presentation element type identifier determines a new style based on at least one display characteristic used to display information contained in a received presentation element; and
   a stylizer that modifies the portion of the at least one presentation element in accordance with the style information corresponding to the new style.

2. The system of claim 1, wherein the stylizer applies the new style to at least one subsequent presentation element.

3. The system of claim 1, further comprising a presentation display device that displays the modified at least one presentation element.

4. The system of claim 1, wherein the style corresponds to a presentation characteristic of the at least one presentation element.

5. The system of claim 4, wherein the presentation characteristic is identified by an attribute identifier.

6. The system of claim 4, wherein the presentation characteristic is at least one of background color, background texture, background image, presentation element transition, font, font size, font spacing, font color, font family, font style, word spacing, letter spacing, text alignment, text indent, line spacing, bullet style, bullet size, bullet color, list style, presentation element orientation, presentation element display time, presentation element size, border color, border width, visual effect, audio effect, design selection and template selection.

7. The system of claim 1, wherein modifying the portion of the at least one presentation element comprises replacing at least one attribute tag of the presentation element with at least one new attribute tag corresponding to the style information.

8. The system of claim 1, wherein:
   the stylizer determines if the portion of the presentation element has a border;
   the memory stores at least one dimension of the border; and
   the stylizer determines an updated dimension of the border after the portion is updated.

9. The system of claim 8, wherein if the updated dimension is greater than the at least one dimension, the stylizer decreases the portion size.

10. The system of claim 8, wherein if the updated dimension is less than the at least one dimension, the stylizer increments the portion size.

11. The system of claim 8, wherein the portion is a font pitch.

12. The system of claim 1, further comprising:
    an identification sensing device that detects at least one tangible sensible style information carrying device; and
    an identification controller that identifies at least one style information based on the sensed at least one tangible sensible style information carrying device.

13. The system of claim 1, further comprising:
    an identification sensing device that detects at least one tangible sensible identification carrying device; and
    an identification controller that identifies at least one presentation element based on the sensed tangible sensible identification carrying device.

14. The system of claim 1, further comprising a history memory that stores a relationship between the style information and the at least one presentation element.

15. The system of claim 1, further comprising a style memory that stores at least one custom style for a particular presentation element.

16. A method that maintains consistency throughout a presentation comprising:
    receiving at least one presentation element, the at least one presentation element containing information to be presented;
    detecting a format of the at least one presentation element;
    determining a new style based on at least one presentation characteristic used to present information contained in a received presentation element; and
    updating a portion of the at least one presentation element based on style information corresponding to the new style.

17. The method of claim 16, further comprising determining available styles based on the detected format.

18. The method of claim 16, wherein the style corresponds to the presentation characteristic of the at least one presentation element.

19. The method of claim 18, wherein the presentation characteristic is identified by an attribute identifier.

20. The method of claim 18, wherein the presentation characteristic is at least one of background color, background texture, background image, presentation element transition, font, font size, font spacing, font color, font family, font style, word spacing, letter spacing, text alignment, text indent, line spacing, bullet style, bullet size, bullet color, list style, presentation element orientation, presentation element display time, presentation element size, border color, border width, visual effect, audio effect, design selection and template selection.

21. The method of claim 16, wherein updating the portion of the at least one presentation element comprises replacing at least one attribute tag of the presentation element with at least one new attribute tag corresponding to the style information.

22. The method of claim 16, further comprising applying the new style to at least one subsequent presentation element.

23. The method of claim 16, further comprising:
    determining if the portion of the presentation element has a border;
    storing at least one dimension of the border; and
    determining an updated dimension of the border after the portion is updated.

24. The method of claim 23, further comprising decrementing the portion size.

25. The method of claim 23, further comprising incrementing the portion size.

26. The method of claim 23, wherein the portion is a font pitch.

27. The method of claim 16, further comprising:
    detecting at least one tangible sensible style information carrying device; and
    identifying at least one style information based on the sensed at least one tangible sensible style information carrying device.

28. The method of claim 16, further comprising:
    detecting at least one tangible sensible identification carrying device; and identifying at least one presentation element based on the sensed tangible sensible identification carrying device.

29. The method of claim 16, further comprising associating the style information with the at least one presentation element.

30. The method of claim 16, further comprising establishing a custom style for a particular presentation element.

31. The method of claim further comprising displaying the updated at least one presentation element.

32. An information storage medium for maintaining consistency throughout a presentation comprising:
- information that receives at least one presentation element, the at least one presentation element containing information to be presented;
- information that detects a format of the at least one presentation element;
- information that determines a new style based on at least one presentation characteristic used to present information contained in a received presentation element; and
- information that updates a portion of the at least one presentation element based on style information corresponding to the new style.

33. The information storage medium of claim 32, further comprising information that determines available styles based on the detected format.

34. The information storage medium of claim 32, wherein the style corresponds to the presentation characteristic of the at least one presentation element.

35. The information storage medium of claim 34, wherein the presentation characteristic is identified by an attribute identifier.

36. The information storage medium of claim 34, wherein the presentation characteristic is at least one of background color, background texture, background image, presentation element transition, font, font size, font spacing, font color, font family, font style, word spacing, letter spacing, text alignment, text indent, line spacing, bullet style, bullet size, bullet color, list style, presentation element orientation, presentation element display time, presentation element size, border color, border width, visual effect, audio effect, design selection and template selection.

37. The information storage medium of claim 32, wherein the information that updates the portion of the at least one presentation element comprises information that replaces at least one attribute tag of the presentation element with at least one new attribute tag corresponding to the style information.

38. The information storage medium of claim 32, further comprising information that applies the new style to at least one subsequent presentation element.

39. The information storage medium of claim 32, further comprising:
- information that determines if the portion of the presentation element has a border;
- information that stores at least one dimension of the border; and
- information that determines an updated dimension of the border after the portion is updated.

40. The information storage medium of claim 39, further comprising information that decrements the portion size.

41. The information storage medium of claim 39, further comprising information that increments the portion size.

42. The information storage medium of claim 39, wherein the portion is a font pitch.

43. The information storage medium of claim 32, further comprising:
- information that detects at least one tangible sensible style information carrying device; and
- information that identifies at least one style information based on the sensed at least one tangible sensible style information carrying device.

44. The information storage medium of claim 32, further comprising:
- information that detects at least one tangible sensible identification carrying device; and
- information that identifies at least one presentation element based on the sensed tangible sensible identification carrying device.

45. The information storage medium of claim 32, further comprising information that associates the style information with the at least one presentation element.

46. The information storage medium of claim 32, further comprising information that establishes a custom style for a particular presentation element.

47. The information storage medium of claim 32, further comprising information that displays the updated at least one presentation element.

* * * * *